United States Patent Office 3,464,898
Patented Sept. 2, 1969

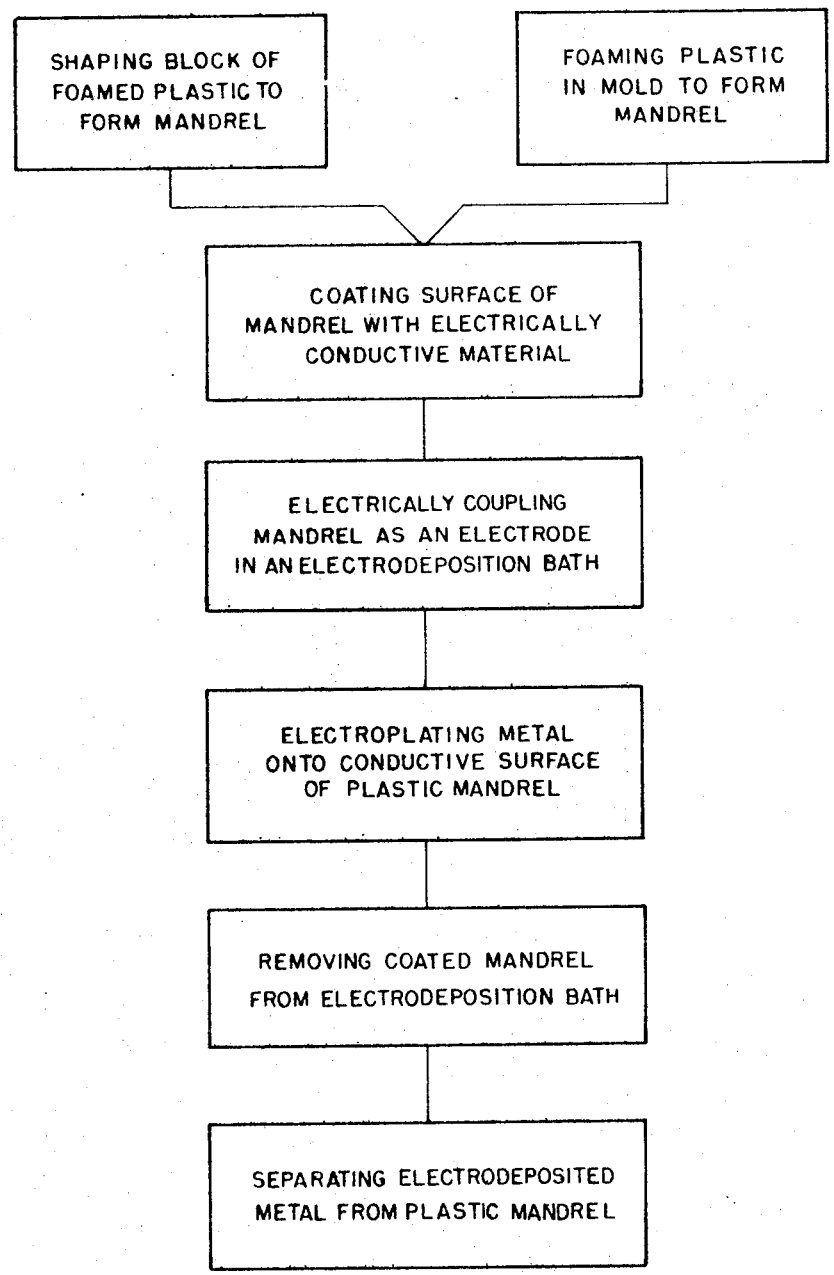

3,464,898
PLASTIC FOAM MANDREL FOR
ELECTROFORMING
Richard J. Norris, Falls Church, Va., assignor to the
United States of America as represented by the Secretary of the Army
Filed May 16, 1966, Ser. No. 550,228
Int. Cl. C23b 7/02
U.S. Cl. 204—9                                       8 Claims

ABSTRACT OF THE DISCLOSURE

An electroforming process for forming complex hollow metal articles which comprise depositing a conductive material onto the surface of a fine porosity foamed plastic mandrel, electrodepositing a layer of metal onto the conductive material and thereafter separating the mandrel from the metal article.

---

The present invention relates to electroforming and more particularly to the use of a foamed plastic mandrel in the preparation of complex metal articles.

Heretofore, in the preparation of hollow metal articles having complex internal structure, it has been the usual procedure to prepare the article in sections so that access could be gained to the inside of the article in order to mechanically affix the internal structural elements. If the completed article were intended to contain a fluid under pressure or a vacuum, then gasketing and sealing materials had to be provided in order to form a leak free article.

If it were attempted to cast the completed article using the normal prior art techniques, then considerable difficulty was encountered in removing the core material. When core sand and a binder were used to form the casting mandrel it was found both time consuming and difficult to remove the last vestiges of the sand.

Accordingly, it is an object of the present invention to provide a process for the preparation of hollow metal articles which does not suffer from the aforesaid disadvantages.

It is another object of the present invention to provide a process for the manufacturing of hollow metal articles having extreme accuracy in the positioning of the internal structural elements.

It is a further object of the present invention to provide a mandrel for use in electroforming hollow metal articles which can be easily shaped and which will maintain dimensional accuracy throughout the electroforming process.

It is still another object of the present invention to provide a mandrel for use in electroforming which can be quickly and completely removed from the metal article upon completion of the electroforming process.

The invention, both as to its organization and method of operation, together with further objects and advantages thereof, will best be understood by reference to the following description.

In accordance with the present invention and as illustrated in the block diagram, a piece of foamed plastic material is formed to correspond to the internal configuration of the metal object to be made. After forming, the plastic mandrel is made electrically conductive by coating the surface with a conductive material. The coated mandrel is then immersed in an electroforming bath and plated with the desired thickness of metal. Upon completion of the electroplating the coated mandrel is removed from the plating bath and rinsed to remove any trace of the plating solution. The foamed plastic mandrel is then removed leaving a one piece, hollow metal article with accurately positioned complex internal structure.

The plastic used to prepare the mandrel should be of a sturdy material having numerous fine pores. The pore size is not critical, however, it should be fine enough so that the metal will plate smoothly. The plastic material should also be capable of being easily handled with little dusting or chipping due to the brittle nature of the foam.

Since the mandrel is to be used in an electroplating bath the plastic selected should be compatible with the components of the plating bath. The compatibility of the plastic is particularly important in maintaining the dimensional accuracy of the mandrel. If the plastic reacted with any component of the plating bath or if it were caused to swell by any component of the plating bath, the dimensional accuracy of the mandrel would be destroyed.

Foamed plastic such as polyethylene, polyurethane and polystyrene can be used in the prcoess of the present invention. Polystyrene is preferred in view of its ready availability at low cost, easy workability and its imperviousness to chemical reaction with the acids and alkalies with which it comes in contact in the present process.

In order to electroplate the polystyrene mandrel, its surface must be made electrically conductive. This can easily be accomplished by spraying the surface with metal powder, painting the surface with a metal slurry, or preplating the surface by means of electroless plating. The metal used to precoat the plastic mandrel should preferably be the same as the metal which is to be electroplated in the final plating process. While use of the same metal is preferred, the process of the present invention does permit the interior of an object to be of a different metal than the exterior. The latter feature is particularly important where the process of the present invention is used to prepare resonant cavities for use at microwave frequencies. The interior of the cavity can be made of silver while the exterior is made of copper.

The process of the present invention can be employed to manufacture articles from numerous different metals. For example, copper, silver, nickel, cadmium, zinc and even alloys such as brass can be readily plated on the plastic mandrel.

In carrying out the process of the present invention a block of foamed plastic material, for example, polystyrene, can be carefully cut and shaped to the exact internal configuration desired in the finished metal piece. Foamed polystyrene can be easily worked with model making tools and machines to form intricate patterns.

The foamed plastic mandrel can also be prepared by foaming the plastic material in place in a suitable mold. The mold can be made from metal and, if necessary, made in several pieces so that the finished plastic mandrel can be easily removed.

In forming a mandrel, sufficient polymeric starting material is placed into the mold. The mold is then heated causing the foaming agent in the plastic to release gas thereby expanding the plastic and completely filling the mold. After cooling, the mandrel can be removed from the mold. The use of a mold to form the mandrel is preferred when numerous identical pieces are to be made.

After the mandrel has been formed and its dimensional accuracy checked, it should be coated with a metal slurry, for example, to make the surface conductive. Any of the numerous commercially available slurries and paints can be employed. The mandrel should only be coated in those areas which are to be plated. Any unplated areas will provide an access way for the removal of the mandrel upon completion of the plating.

The conductive mandrel should then be immersed in a plating solution and coupled for electrodeposition. The plating of the mandrel can be done with any process capable of producing a smooth relatively thick coating. In plating pieces having complex internal structures, the rate of plating should be controlled so that both the internal structural elements and outer shell reach the desired thickness.

Upon completion of the electroplating, the coated mandrel should be removed from the electroplating bath and rinsed thoroughly with water to remove all trace of the plating chemicals. The mandrel will have a uniform heavy coating of metal on all surfaces which had been made conductive before immersion in the plating bath.

The foamed plastic mandrel is then separated from the electroplated metal by use of a solvent or by heating and volatilizing the plastic. The solvent used to remove the mandrel should not affect the electrodeposited metal. When a foamed polystyrene mandrel is used, trichloroethylene will quickly and thoroughly remove all trace of the mandrel. Numerous other solvents can also be employed with any of the suggested foamed plastic materials.

The mandrel can also be removed by heating and volatilizing the plastic material. If the electroformed part has several openings, the coated mandrel can be placed into an evacuated oven or an oven with circulating gas and heated. If the part has a single opening, it can be connected, through suitable traps, to a vacuum source and baked out under vacuum.

After removal of the mandrel the surface of the metal part can be machined, if necessary, to remove all rough or feathered edges which might have formed during the plating step. The metal part can also be drilled and tapped and prepared for its ultimate use.

It can be seen that through the process of the present invention a quick, simple and inexpensive process is provided for the manufacture of metal parts. The process being particularly useful in the manufacture of hollow metal parts having complex internal structure.

While a particular embodiment of the invention has been described, it will be understood of course, that it is not desired that the invention be limited thereto.

What is claimed is:

1. A process for forming complex hollow metal articles comprising the following steps:
   (a) forming a piece of fine porosity foamed plastic into a mandrel having the internal configuration of the desired object;
   (b) coating those areas on the mandrel upon which metal is to be deposited with an electrically conductive material;
   (c) electrically coupling said foamed mandrel as an electrode in an electrodeposition bath;
   (d) depositing a layer of metal on the surface of said foamed plastic mandrel;
   (e) removing said mandrel from the electrodeposition bath after the desired layer of metal has deposited;
   (f) separating the foamed plastic mandrel from the metal article to complete the preparation of the metal article.

2. The process of claim 1 wherein the step of forming a piece of foamed plastic into a mandrel is carried out by cutting and shaping a block of foamed plastic.

3. The process of claim 1 wherein the step of forming a piece of foamed plastic into a mandrel is carried out by foaming a plastic material in a mold.

4. The process of claim 1 wherein the step of coating the mandrel with an electrically conductive material is carried out by painting the mandrel with a metal slurry.

5. The process of claim 1 wherein the step of coating the mandrel with an electrically conductive material is carried out by spraying the mandrel with a metal powder.

6. The process of claim 1 wherein the step of coating the mandrel with an electrically conductive material is carried out by electroless deposition.

7. The process of claim 1 wherein the step of separating is carried out by dissolving the mandrel with a suitable solvent.

8. The process of claim 1 wherein the step of separating is carried out by volatilizing the plastic mandrel from the metal article.

References Cited

UNITED STATES PATENTS

| 2,694,743 | 11/1954 | Ruskin et al. | 204—20 |
| 2,932,609 | 4/1960 | Pierce | 204—9 |

OTHER REFERENCES

Don't Overlook Electroforming, W. H. SaFranek, Product Engineering, June 5, 1961, copy in 204–3, pp. 609–614.

JOHN H. MACK, Primary Examiner

T. TUFARIELLO, Assistant Examiner

U.S. Cl. X.R.

204—4